United States Patent
Baxter et al.

(10) Patent No.: US 11,002,481 B2
(45) Date of Patent: May 11, 2021

(54) METHOD FOR REMOVING A FOULANT FROM A GAS STREAM WITHOUT EXTERNAL REFRIGERATION

(71) Applicant: Sustainable Energy Solutions, Inc., Provo, UT (US)

(72) Inventors: Larry Baxter, Orem, UT (US); Christopher Hoeger, Provo, UT (US); Eric Mansfield, Spanish Fork, UT (US)

(73) Assignee: Sustainable Energy Solutions, Inc., Ball Ground, GA (US)

( * ) Notice: Subject to any disclaimer, the term of this patent is extended or adjusted under 35 U.S.C. 154(b) by 311 days.

(21) Appl. No.: 15/464,271

(22) Filed: Mar. 20, 2017

(65) Prior Publication Data

US 2018/0266762 A1 Sep. 20, 2018

(51) Int. Cl.
*F25J 3/02* (2006.01)
*B01D 53/00* (2006.01)

(52) U.S. Cl.
CPC .......... *F25J 3/0266* (2013.01); *B01D 53/002* (2013.01); *F25J 3/0209* (2013.01); *F25J 3/0219* (2013.01); *F25J 3/0223* (2013.01); *F25J 3/0233* (2013.01); *F25J 3/0252* (2013.01); *B01D 2257/504* (2013.01); *B01D 2258/0283* (2013.01); *F25J 2205/02* (2013.01); *F25J 2205/20* (2013.01); *F25J 2205/30* (2013.01); *F25J 2205/50* (2013.01); *F25J 2210/12* (2013.01); *F25J 2210/70* (2013.01); *F25J 2220/82* (2013.01); *F25J 2230/80* (2013.01); *F25J 2235/80* (2013.01); *F25J 2240/02* (2013.01); *F25J 2270/12* (2013.01); *F25J 2270/60* (2013.01);

(Continued)

(58) Field of Classification Search
CPC ........ F25J 3/0266; F25J 3/0209; F25J 3/0219; F25J 3/0223; F25J 3/0233; F25J 3/0252; F25J 2205/02; F25J 2205/20; F25J 2205/30; F25J 2205/50; F25J 2210/12; F25J 2210/70; F25J 2220/82; F25J 2230/80; F25J 2235/80; F25J 2240/02; F25J 2270/12; F25J 2270/60; F25J 2270/90; F25J 2280/40; Y02C 20/40; B01D 2257/504; B01D 2258/0283; B01D 53/002

See application file for complete search history.

(56) References Cited

U.S. PATENT DOCUMENTS

| | | | |
|---|---|---|---|
| 8,973,398 B2 * | 3/2015 | Coyle | F25J 3/04272 62/611 |
| 2013/0199238 A1 * | 8/2013 | Mock | F25J 1/004 62/611 |

(Continued)

*Primary Examiner* — Gordon A Jones
(74) *Attorney, Agent, or Firm* — Cook Alex Ltd.; R. Blake Johnston

(57) ABSTRACT

A process for removing a foulant from a gas stream is disclosed. The gas stream, containing a foulant, is cooled across a first heat exchanger and a second heat exchanger, producing a solid foulant entrained in cryogenic liquid as a foulant slurry, and a foulant-depleted gas stream. The foulant-depleted gas stream is passed through a cryogenic turbine and a first separation vessel, producing a light gas stream and further solid foulant. The solid foulants are recovered by a combination of pressurization, melting, and distillation to produce a liquid foulant product. Heat is recovered from the various streams in the various heat exchangers and the melter.

20 Claims, 6 Drawing Sheets

(52) U.S. Cl.
CPC ........ *F25J 2270/90* (2013.01); *F25J 2280/40* (2013.01); *Y02C 20/40* (2020.08)

(56) References Cited

U.S. PATENT DOCUMENTS

| | | | |
|---|---|---|---|
| 2013/0340475 A1* | 12/2013 | Turner | F25J 1/0204 |
| | | | 62/613 |
| 2017/0016667 A1* | 1/2017 | Huntington | F25J 1/0042 |
| 2017/0038137 A1* | 2/2017 | Turney | F25J 1/0224 |
| 2017/0167786 A1* | 6/2017 | Pierre, Jr. | F25J 1/0254 |

* cited by examiner

METHOD FOR REMOVING A FOULANT FROM A GAS STREAM WITHOUT EXTERNAL REFRIGERATION

This invention was made with government support under DE-FE0028697 awarded by The Department of Energy. The government has certain rights in the invention.

BACKGROUND

Field of the Invention

This invention relates generally to the field of foulant removal from gases. Our immediate interest is in removal of a contaminant, such as carbon dioxide, from a carrier gas, such as flue gas.

Background

The art of cryogenic capture of foulants from carrier gases is relatively young. The ability to capture foulants like carbon dioxide is of great importance to environmentally sound industrial progress. However, the greatest difficulty in capturing foulants from gases is the excessive energy requirement. The ability to make a process that minimizes the energy costs for foulant capture is needed.

United States patent publication number 20140144178 to Terrien et al. teaches an optimized heat exchange for a carbon dioxide de-sublimation process. This differs from the present disclosure in that, in the prior disclosure, only carbon dioxide can be removed from the gas, external refrigeration is required on the melting heat exchanger, the reverse Rankine cycle occurs in the melting and desublimating heat exchangers, no distillation column is utilized for heat exchange, and other process differences readily apparent to someone of normal skill in the art. This disclosure is pertinent and may benefit from the methods disclosed herein and is hereby incorporated for reference in its entirety for all that it teaches.

United States patent publication number 20120297821 to Baxter et al. teaches systems and methods for separating condensable vapors from light gases or liquids by recuperative cryogenic processes. This differs from the present disclosure in that, in the prior disclosure, external refrigeration is required on the melting heat exchanger, no distillation column is utilized, and other process differences readily apparent to someone of normal skill in the art. This disclosure is pertinent and may benefit from the methods disclosed herein and is hereby incorporated for reference in its entirety for all that it teaches.

SUMMARY

A process for removing a foulant from a gas stream is disclosed. The gas stream, containing a foulant, is cooled in a first heat exchanger to a first temperature that is above a frosting point of the foulant to form a cooled gas stream. The cooled gas stream is cooled further in a second heat exchanger against a cryogenic liquid stream to a second temperature that is below the frosting point of the foulant. A portion of the foulant within the cooled gas stream desublimates, thereby forming a foulant-depleted gas stream and a first solid foulant stream, the first solid foulant stream becoming entrained in the cryogenic liquid stream, forming a foulant slurry stream. The foulant slurry stream is withdrawn from the second heat exchanger. The foulant-depleted gas stream is withdrawn from the second heat exchanger through a cryogenic turbine and a first separation vessel. The foulant-depleted gas stream is expanded and separated into a light gas stream and a second solid foulant stream in the first separation vessel. The light gas stream is warmed across the third heat exchanger and the first heat exchanger, producing a warmed light gas stream. The foulant slurry stream is pressurized and cooled across the third heat exchanger to produce a pressurized foulant slurry stream that is at or exceeds the triple point of the foulant. The pressurized foulant slurry stream is separated into a first pressurized foulant solid stream and the cryogenic liquid stream. The second solid foulant stream is pressurized to produce a second pressurized solid foulant stream that is at or exceeds the triple point of the foulant. The first pressurized foulant solid stream is melted in a first melting heat exchanger to produce a first portion of a first liquid foulant stream. The second pressurized foulant solid stream is melted in the first melting heat exchanger to produce a second portion of the first liquid foulant stream; or, a second melting heat exchanger to produce a second portion of the first liquid foulant stream, a second liquid foulant stream, or a combination thereof. The first liquid foulant stream is heated in the first heat exchanger to form a warmed foulant fluid stream. The warmed foulant fluid stream is provided to a side inlet of a distillation column. The distillation column separates the warmed foulant fluid stream into an overhead foulant stream and a bottoms stream. The overhead foulant stream is cooled across the melting heat exchanger, forming a cooled overhead foulant stream. A portion of the cooled overhead foulant stream is recycled to a top inlet of the distillation column. A first portion of the bottoms stream is warmed in a recycle warming heat exchanger to produce a warmed bottoms stream. The warmed bottoms stream is recycled to a lower inlet of the distillation column. A second portion of the bottoms stream is cooled across the first heat exchanger to produce a cooled cryogenic liquid recycle stream. In this manner, the foulant is removed from the gas stream.

The gas stream may comprise combustion flue gas, syngas, producer gas, natural gas, steam reforming gas, any hydrocarbon that has a lower freezing point than the temperature of the coolant, light gases, refinery off-gases, or combinations thereof.

The cooled cryogenic liquid recycle stream may recombine in a location that may comprise the second heat exchanger, the third heat exchanger, or the foulant slurry stream.

A portion of refrigeration may be provided to the first heat exchanger using a reverse Rankine refrigeration cycle having a refrigerant, wherein the reverse Rankine refrigeration cycle comprises the steps of a) compressing the refrigerant, b) condensing the refrigerant, c) expanding the refrigerant, and, d) vaporizing the refrigerant. Step (b) occurs in the first heat exchanger. Step (d) occurs in the first heat exchanger.

Step (b) may also include a supplemental ambient heat exchange process. Step (b) may also include at least two ambient heat exchangers in parallel before the first heat exchanger. The at least two ambient heat exchangers may operate at different pressures, the different pressures matching different portions of a heat exchange process curve for the refrigerant.

The refrigerant may comprise ethane, methane, propane, R14, nitrogen, oxygen, argon, helium, xenon, other light gases, aliphatic hydrocarbons, aromatic hydrocarbons, other refrigerants, or combinations thereof.

The foulant product may be provided to a second separation vessel and separated into an overhead vapor foulant product stream and a bottoms liquid foulant product stream; the bottoms liquid foulant product stream is removed and pressurized; the overhead vapor foulant product stream is removed, compressed, and then cooled across the first heat exchanger and recombined with the bottoms liquid foulant product stream and pressurized and warmed across the first heat exchanger.

The foulant product may be provided to a second separation vessel and separated into an overhead vapor foulant product stream and a bottoms liquid foulant product stream; the bottoms liquid foulant product stream is removed and pressurized; the overhead vapor foulant product stream is warmed across the first heat exchanger, compressed, cooled across the first heat exchanger, and then combined with the bottoms foulant product stream before being pressurized and warmed across the first heat exchanger.

The cryogenic liquid may comprise any compound or mixture of compounds with a freezing point above a temperature at which a solid forms from the foulant. The cryogenic liquid may comprise 1,1,3-trimethylcyclopentane, 1,4-pentadiene, 1,5-hexadiene, 1-butene, 1-methyl-1-ethylcyclopentane, 1-pentene, 2,3,3,3-tetrafluoropropene, 2,3-dimethyl-1-butene, 2-chloro-1,1,1,2-tetrafluoroethane, 2-methylpentane, 3-methyl-1,4-pentadiene, 3-methyl-1-butene, 3-methyl-1-pentene, 3-methylpentane, 4-methyl-1-hexene, 4-methyl-1-pentene, 4-methylcyclopentene, 4-methyl-trans-2-pentene, bromochlorodifluoromethane, bromodifluoromethane, bromotrifluoroethylene, chlorotrifluoroethylene, cis 2-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, or combinations thereof. The foulant may comprise carbon dioxide, nitrogen oxide, sulfur dioxide, nitrogen dioxide, sulfur trioxide, hydrogen sulfide, hydrogen cyanide, water, hydrocarbons with a freezing point above a temperature of the cryogenic liquid stream, or combinations thereof.

The second heat exchanger may comprise a spray tower, hail tower, bubbler, fluidized bed, or combinations thereof.

The foulant slurry stream may be pressurized by a pump preceding the third heat exchanger. The second solid foulant stream may be pressurized by a pump.

The pressurized foulant slurry stream may be separated into the pressurized foulant solid stream and the cryogenic liquid stream by a device comprising a screw press, rollers, a mangle, a filter press, or combinations thereof.

The third heat exchanger may be a non-fouling heat exchanger.

The second liquid foulant stream may be provided to the side inlet of the distillation column. The second liquid foulant stream may be used for a heat recovery step.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Figure 1:
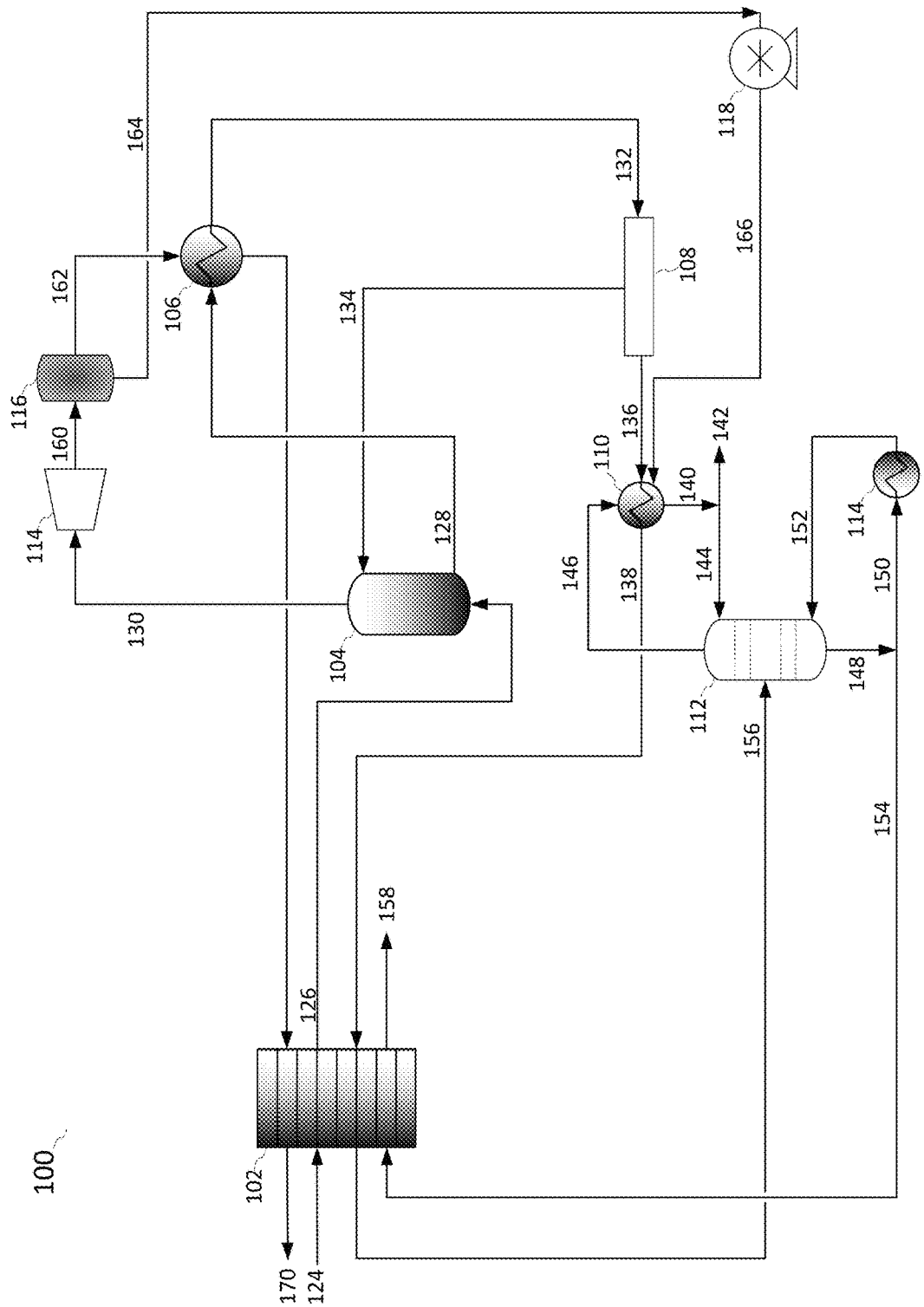
FIG. 1 shows a process flow diagram for removing a foulant from a gas stream.

Referring to FIG. 1, a process flow diagram 100 is shown, as per one embodiment of the present invention. Gas stream 124, containing a foulant, is cooled across first heat exchanger 102 to a first temperature that is above a frosting point of the foulant to form cooled gas stream 126. Cooled gas stream 126 is cooled against cryogenic liquid stream 134 in second heat exchanger 104 to a second temperature that is below the frosting point of the foulant. A portion of the foulant desublimates to form a first solid foulant, leaving foulant-depleted gas stream 130. The first solid foulant stream becomes entrained in cryogenic liquid stream 134, resulting in foulant slurry stream 128. Foulant slurry stream 128 is withdrawn from the second heat exchanger. Foulant-depleted gas stream 130 is expanded through cryogenic turbine 114 and separated in first separation vessel 116 to produce light gas stream 162 and second solid foulant stream 164. Light gas stream 162 is warmed across third heat exchanger 106 and first heat exchanger 102 to produce warmed light gas stream 170. Foulant slurry stream 128 is pressurized and then cooled across third heat exchanger 106 to produce pressurized foulant slurry stream 132. Pressurized foulant slurry stream 132 is at or exceeds the triple point of the foulant. Pressurized foulant slurry stream 132 is separated in solid-liquid separator 108 to produce first pressurized foulant solid stream 136 and cryogenic liquid stream 134. Second solid foulant stream 164 is pressurized across second pump 118 to produce second pressurized solid foulant stream 166 that is at or exceeds the triple point of the foulant. First pressurized foulant solid stream 136 and second pressurized solid foulant stream 166 are combined and melted in first melting heat exchanger 110 to produce first liquid foulant stream 138. First liquid foulant stream 138 is heated in first heat exchanger 102 to produce warmed foulant fluid stream 156. Warmed foulant fluid stream 156 is provided to a side inlet of distillation column 112. Distillation column 112 separates warmed foulant fluid stream 156 into overhead foulant stream 146 and bottoms stream 148.

Overhead foulant stream 146 is cooled across melting heat exchanger 110 to produce cooled overhead foulant stream 140. A first portion 144 of cooled overhead foulant stream 140 is recycled to a top inlet of distillation column 112 while the remainder is removed as foulant product 142. A first portion 150 of bottoms stream 148 is warmed in recycle warming heat exchanger 114 to produce warmed bottoms stream 152 and then recycled to a lower inlet of distillation column 112. The remainder 154 of bottoms stream 148 is cooled across first heat exchanger 102 to produce cooled cryogenic liquid recycle stream 158. In some embodiments, second pressurized solid foulant stream 166 is melted in a second melting heat exchanger and the resulting second liquid foulant stream is combined with first liquid foulant stream 138. In other embodiments, the resulting second liquid foulant stream is combined with warmed foulant fluid stream 156.

Figure 2:
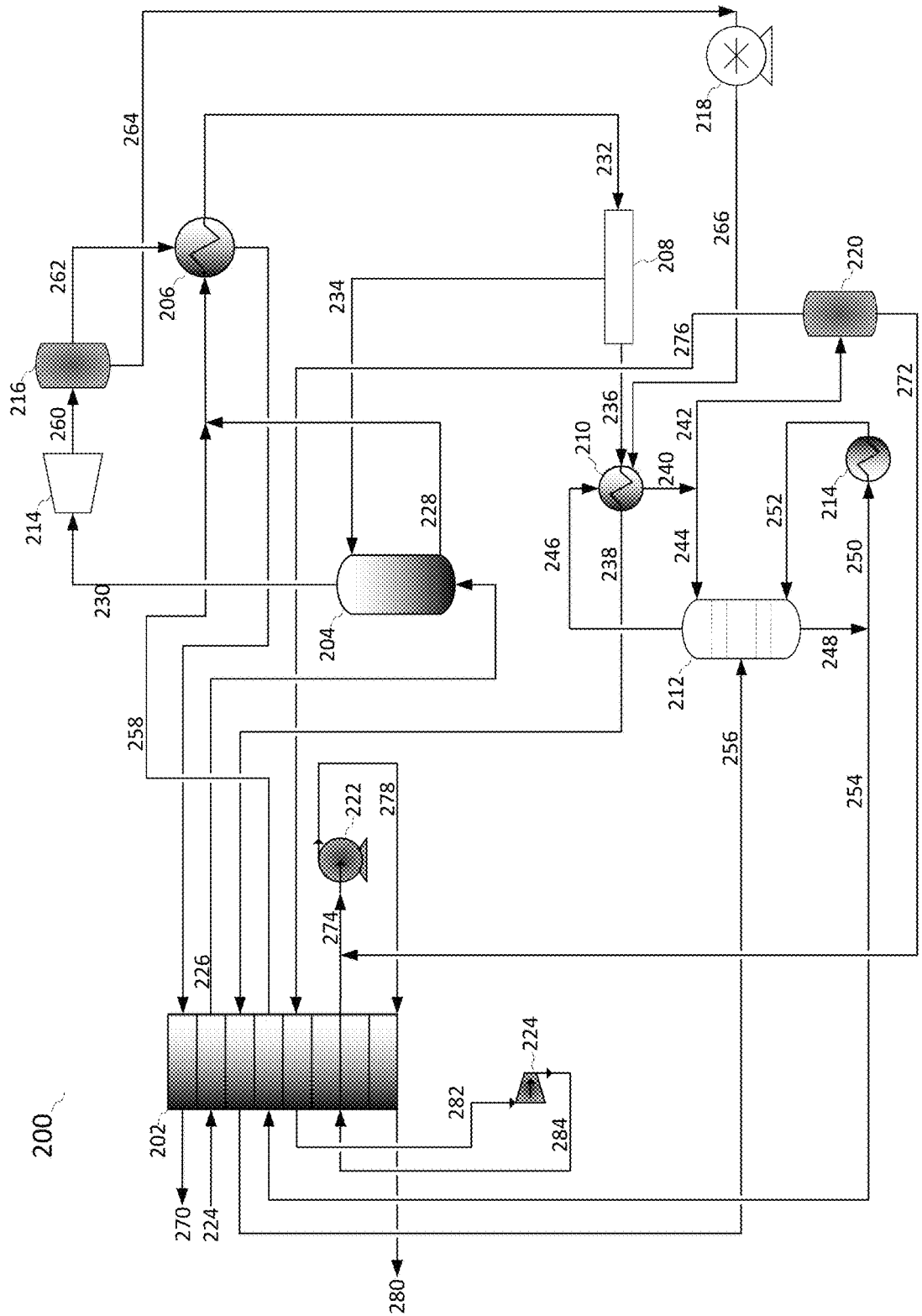
FIG. 2 shows a process flow diagram for removing carbon dioxide as a foulant from a combustion flue gas stream.

Referring to FIG. 2, a process flow diagram 200 is shown, as per one embodiment of the present invention. Combustion flue gas stream 224, containing carbon dioxide, is cooled across first heat exchanger 202 to a first temperature that is above a frosting point of carbon dioxide to form cooled gas stream 226. Cooled gas stream 226 is cooled against cryogenic liquid stream 234 in second heat exchanger 204 to a second temperature that is below the frosting point of carbon dioxide. A portion of the carbon dioxide desublimates to form a first solid foulant, leaving foulant-depleted gas stream 230. The first solid foulant stream becomes entrained in cryogenic liquid stream 234, resulting in foulant slurry stream 228. Foulant slurry stream 228 is withdrawn from the second heat exchanger. Foulant-depleted gas stream 230 is expanded through cryogenic turbine 214 and separated in first separation vessel 216 to produce light gas stream 262 and second solid foulant stream 264. Light gas stream 262 is warmed across third heat exchanger 206 and first heat exchanger 202 to produce warmed light gas stream 270. Foulant slurry stream 228 is pressurized and then cooled across third heat exchanger 206 to produce pressurized foulant slurry stream 232. Pressurized foulant slurry stream 232 is at or exceeds the triple point of carbon dioxide. Pressurized foulant slurry stream 232 is separated in solid-liquid separator 208 to produce first pressurized foulant solid stream 236 and cryogenic liquid stream 234. Second solid foulant stream 264 is pressurized across second pump 218 to produce second pressurized solid foulant stream 266 that is at or exceeds the triple point of the foulant. First pressurized foulant solid stream 236 and second pressurized solid foulant stream 266 are combined and melted in first melting heat exchanger 210 to produce first liquid foulant stream 238. First liquid foulant stream 238 is heated in first heat exchanger 202 to produce warmed foulant fluid stream 256. Warmed foulant fluid stream 256 is provided to a side inlet of distillation column 212. Distillation column 212 separates warmed foulant fluid stream 256 into overhead foulant stream 246 and bottoms stream 248. Overhead foulant stream 246 is cooled across melting heat exchanger 210 to produce cooled overhead foulant stream 240. A first portion 244 of cooled overhead foulant stream 240 is recycled to a top inlet of distillation column 212 while the remainder 242 is passed to second separation vessel 220, producing overhead vapor foulant product stream 276 and bottoms liquid foulant product stream 272. Bottoms liquid foulant product stream 272 is pressurized across pump 222. Overhead vapor foulant product stream 276 is warmed across first heat exchanger 202, compressed across compressor 224, cooled across first heat exchanger 202, and then combined with bottoms liquid foulant product stream 272 for pressurization across pump 222, the result being warmed across first heat exchanger 202 to produce liquid carbon dioxide product 280. A first portion 150 of bottoms stream 248 is warmed in recycle warming heat exchanger 214 to produce warmed bottoms stream 252 and then recycled to a lower inlet of distillation column 212. The remainder 254 of bottoms stream 248 is cooled across first heat exchanger 202 to produce cooled cryogenic liquid recycle stream 258, which is combined with foulant slurry stream 228. In some embodiments, second pressurized solid foulant stream 266 is melted in a second melting heat exchanger and the resulting second liquid foulant stream is combined with first liquid foulant stream 238. In other embodiments, the resulting second liquid foulant stream is combined with warmed foulant fluid stream 256. In some embodiments, cooled cryogenic liquid recycle stream 258 is provided to second heat exchanger 204.

Figure 3:
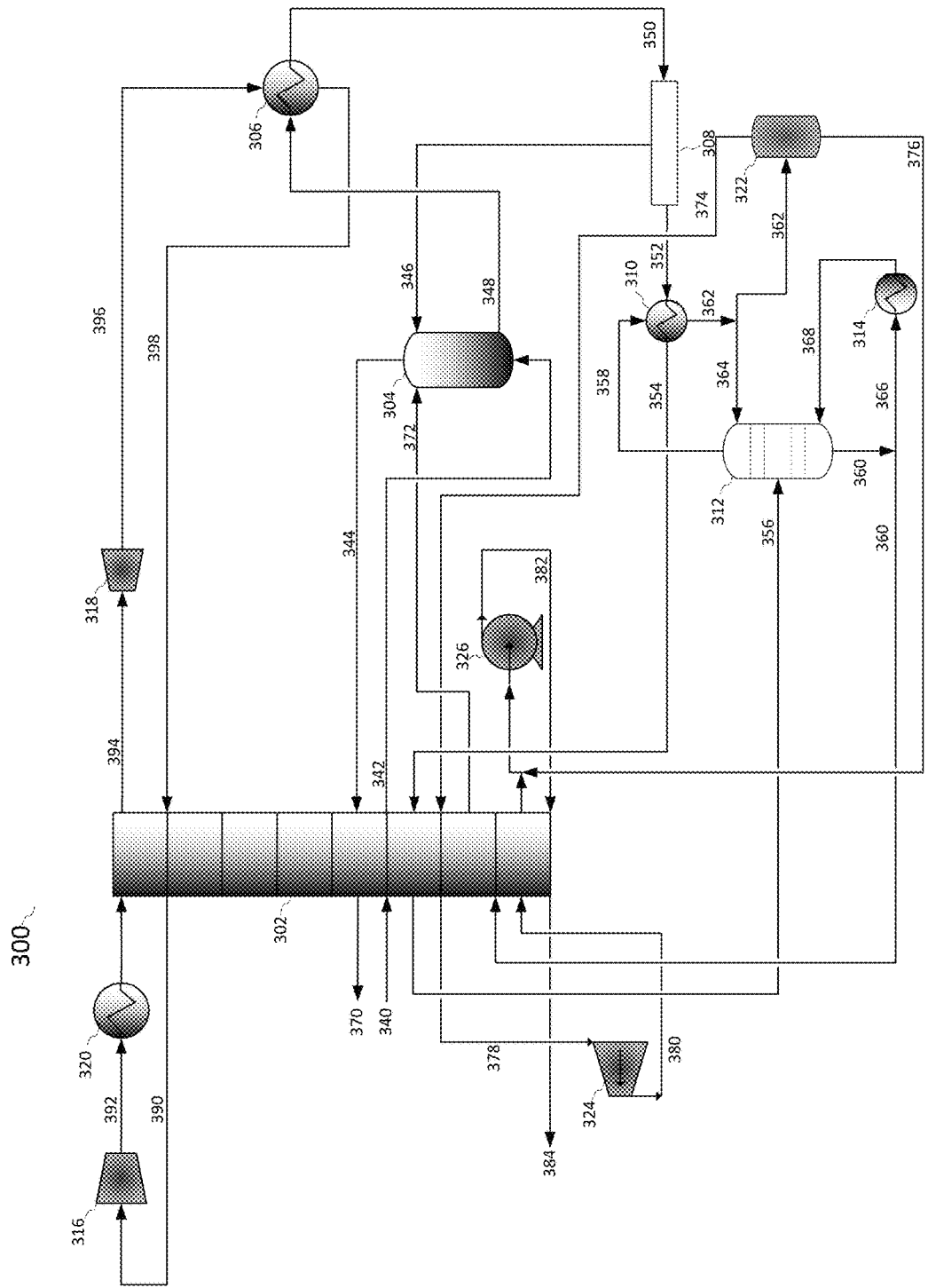
FIG. 3 shows a process flow diagram for Prior Art for the removal of carbon dioxide from a combustion flue gas stream.

Referring to FIG. 3, Prior Art showing a process flow diagram for separating carbon dioxide from a combustion flue gas is shown at 300. This will be readily understood to be distinct from the present invention, in that the Prior Art requires an external refrigeration system to operate and has no cryogenic turbine and separation system for processing the foulant-depleted gas stream. Gas stream 340, containing a foulant, is cooled across first heat exchanger 302 to a first temperature that is above a frosting point of the foulant, forming cooled gas stream 342. Cooled gas stream 342 is cooled by contact with cryogenic liquid stream 310 and cooled cryogenic liquid recycle stream 362 in second heat exchanger 304 to a second temperature, below the frosting point of the foulant, causing a portion of the foulant within cooled compressed stream 342 to desublimate, forming foulant depleted gas stream 344 and a solid foulant stream. Foulant depleted gas stream 344 leaves second heat exchanger 304 and is warmed across warmed across first heat exchanger 302 to produce warmed foulant depleted gas stream 370. The solid foulant stream becomes entrained in cryogenic liquid stream 346, forming foulant slurry stream 348. Foulant slurry stream 348 is withdrawn from second heat exchanger 304, pressurized, and provided to third heat exchanger 306, where it is cooled to form pressurized foulant slurry stream 350, that is at or exceeds the triple point of the foulant. Pressurized foulant slurry stream 350 is separated into pressurized foulant solid stream 352 and cryogenic liquid stream 346 by separator 308. Pressurized foulant solid stream 352 is melted in melting heat exchanger 310 to produce liquid foulant stream 354. Liquid foulant stream 354 is heated across first heat exchanger 302 to form warmed foulant fluid stream 356. Warmed foulant fluid stream 356 is provided to a side inlet of distillation column 312. Distillation column 312 separates warmed foulant fluid stream 356 into cooled liquid overhead foulant stream 358 and warmed cryogenic liquid stream 360. Cooled liquid overhead foulant stream 358 is provided as heating for melting heat exchanger 310, producing overhead foulant stream 362. A portion of overhead foulant stream 362 is recycled to a top inlet of distillation column 312 as overhead recycle stream 364, while the remainder is provided to separation vessel 322, separating into overhead vapor foulant product stream 374 and bottoms liquid foulant product stream 376. Overhead vapor foulant product stream 374 is warmed across first heat exchanger 302 to produce warmed overhead vapor foulant product stream 378, which is compressed across compressor 324 to produce compressed overhead foulant product stream 380. Compressed overhead foulant product stream 380 is cooled across first heat exchanger 302 and combined with bottoms liquid foulant product stream 376, then pressurized through foulant pump 326 to produce pressurized foulant product 382. Pressurized foulant product 382 is warmed across first heat exchanger 302 to produce final liquid foulant product 384. A portion of warmed cryogenic liquid stream 360 is provided to recycle warming heat exchanger 314 as recycle cryogenic liquid stream 366 and warmed to produce warmed cryogenic liquid stream 368, which is recycled to a bottom inlet of distillation column 312. The remainder of warmed cryogenic liquid stream 360 is cooled across first heat exchanger 302, producing cooled cryogenic liquid recycle stream 372, which is provided to second heat exchanger 304. A first portion of external refrigeration is provided using a first reverse Rankine refrigeration cycle having first refrigerant 390. This cycle consists of compressing first refrigerant 390 in first cycle compressor 316 to first compressed refrigerant 392. First compressed refrigerant 392 is cooled across a first ambient heat exchanger 320 and across first heat exchanger 302 to produce first cooled compressed refrigerant 394. First cooled compressed refrigerant 394 is expanded across first cycle expander 318 to form first expanded refrigerant 396, which is used as coolant in third heat exchanger 306, forming first warmed expanded refrigerant 398, which is warmed further across first heat exchanger 302 to form first refrigerant 390. In this manner, the foulant is removed from gas stream 340. In some embodiments, cooled cryogenic liquid recycle stream 372 is sent to third heat exchanger 306, or combined with foulant slurry stream 348. In some embodiments, compressor 324 is bypassed.

Figure 4:
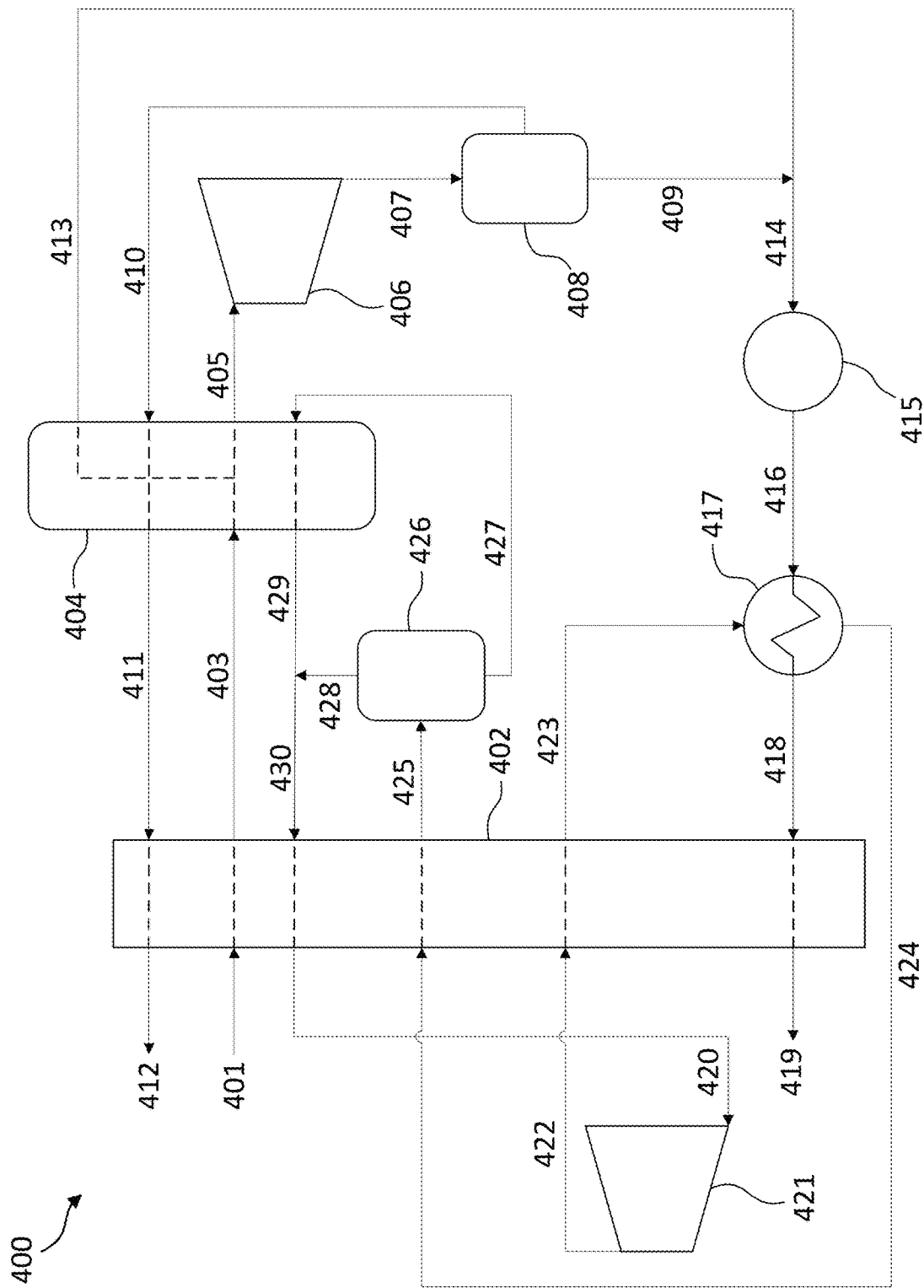
FIG. 4 shows a process flow diagram for Prior Art for separating carbon dioxide from a combustion flue gas stream.

Referring to FIG. 4, Prior Art showing a process flow diagram for separating carbon dioxide from a combustion flue gas is shown at 400. This Prior Art differs from the present disclosure in that, in the prior disclosure, only carbon dioxide can be removed from the gas, expansion of a carbon dioxide poor gas stream is required, external refrigeration is required on the melting heat exchanger, the reverse Rankine cycle occurs in the melting and desublimating heat exchangers, and no distillation column is utilized for heat exchange. The process description below is an edited version of the original detailed description from United States patent publication number 20140144178 to Terrien, et al., modified for simplicity and to match FIG. 4 numbering. The compressed flue gas stream 401 is first cooled down to above frosting point temperature in a multi-fluid heat exchanger 402. After multi-fluid heat exchanger 402, the refrigerated flue gas 403 is sent to a de-sublimating heat exchanger 404 where part of the CO2 is de-sublimated 413. After the de-sublimating heat exchanger 404, the partially CO2 depleted flue gas 405 is sent to an expansion turbine 406 where it is expanded to almost atmospheric pressure 407 and the remainder of the CO2 to be captured is recovered as solids 409 in solids separator 408. The solid CO2 streams 413 and 409 are mixed together 414 and pumped to a high pressure 416 in solids pressurizer 415. This pressure should be high enough to not vaporize at ambient temperature. Then the high pressure CO2 stream 416 is sent to a melting heat exchanger 417 where most of the sensible heat plus the latent heat of fusion is recovered by the condensing refrigerant 423. The liquefied CO2 418 is then sent to the multi-fluid heat exchanger 402 to recover the sensible heat of the liquid, after which the warmed fluid 419 exits the system. The depleted cold gas 410 is sent to the de-sublimating heat exchanger 404 and then to the multi-fluid heat exchanger 402 to recover all the cold. It is then pumped to the final pressure (not shown). A small refrigeration loop is required in this configuration. The refrigerant cycle is an inversed Rankine cycle, the condensation happens in the melting heat exchanger 417, close to CO2 triple point temperature, and vaporization happens in the de-sublimating heat exchanger 404, below the outlet temperature of the de-sublimating heat exchanger. However, all other heat recovery involved will happen in the multi-fluid heat exchanger 402. The following points are important in order to achieve a high efficiency. There needs to be partial de-sublimation of the flue gas prior to the turbine, thus allowing less temperature difference between the inlet and the outlet of the turbine. This also allows the pressure required for the flue gas to be as low as approximately 6 bar absolute. There needs to be an inversed Rankine cycle of the refrigerant with condensation happening at CO2 melting temperature. There needs to be heat recovery of all fluids not involving solid CO2 in the multi-fluid heat exchanger. The heat integration between flue gas lines, CO2 lines and refrigerant lines allows lowering the average temperature difference.

Figure 5:
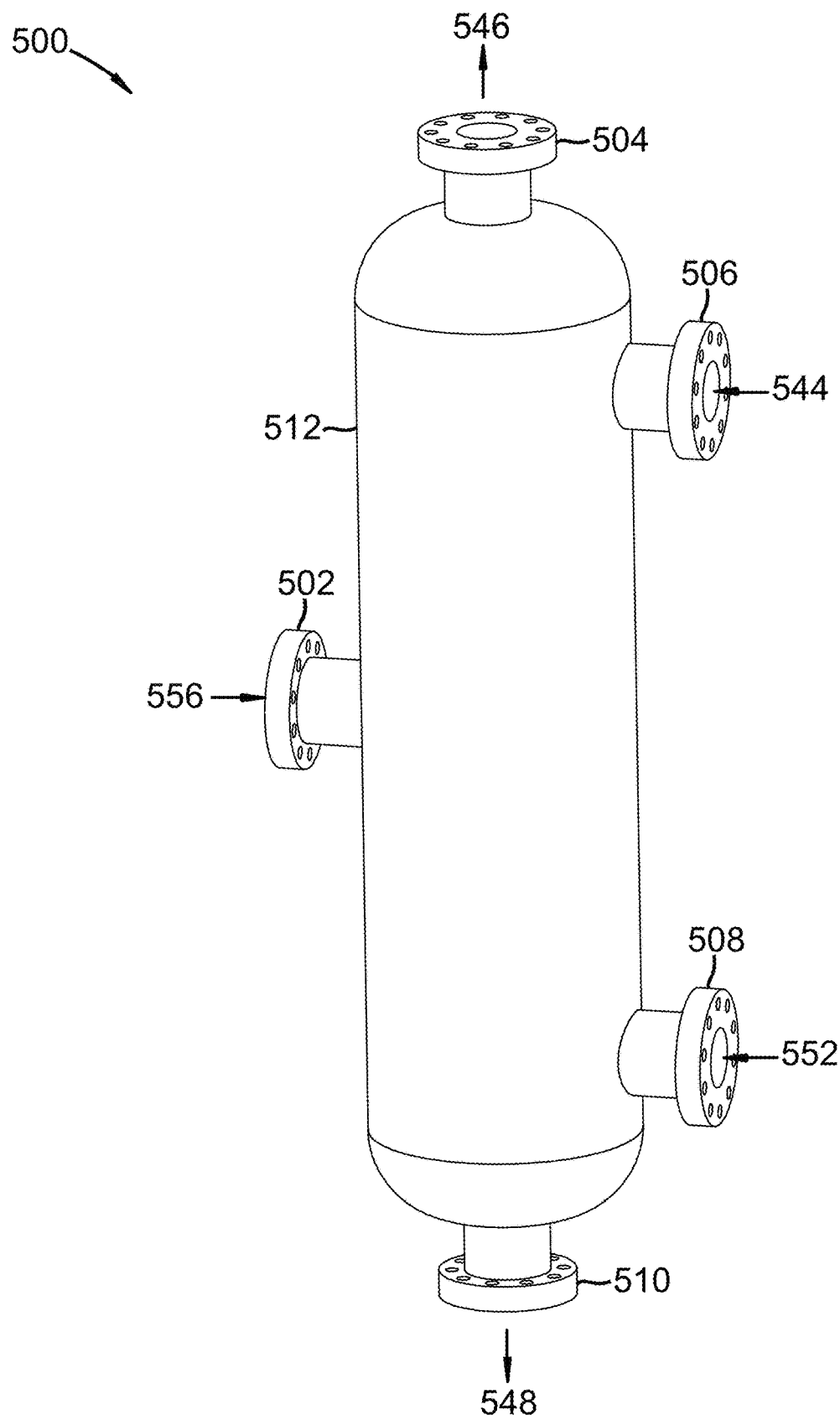
FIG. 5 shows a distillation column for use in the process shown in FIG. 1.

Referring to FIG. 5, distillation column 112 is shown at 500, as per FIG. 1. Warmed foulant fluid stream 556 is provided to side inlet 502 of distillation column 512. Distillation column 512 separates warmed foulant fluid stream 556 into overhead foulant stream 546 and bottoms stream 548. Overhead foulant stream 546 leaves through top outlet 504 and is cooled across the melting heat exchanger (not shown) to produce the cooled overhead foulant stream. A first portion 544 of the cooled overhead foulant stream is recycled to top inlet 506 of distillation column 512 while the remainder is removed as the foulant product. Bottoms stream 548 leaves through bottoms outlet 510, and a first portion of bottoms stream 548 is warmed in the recycle warming heat exchanger (not shown) to produce warmed bottoms stream 552, which is then recycled to lower inlet 508 of distillation column 512.

Figure 6:
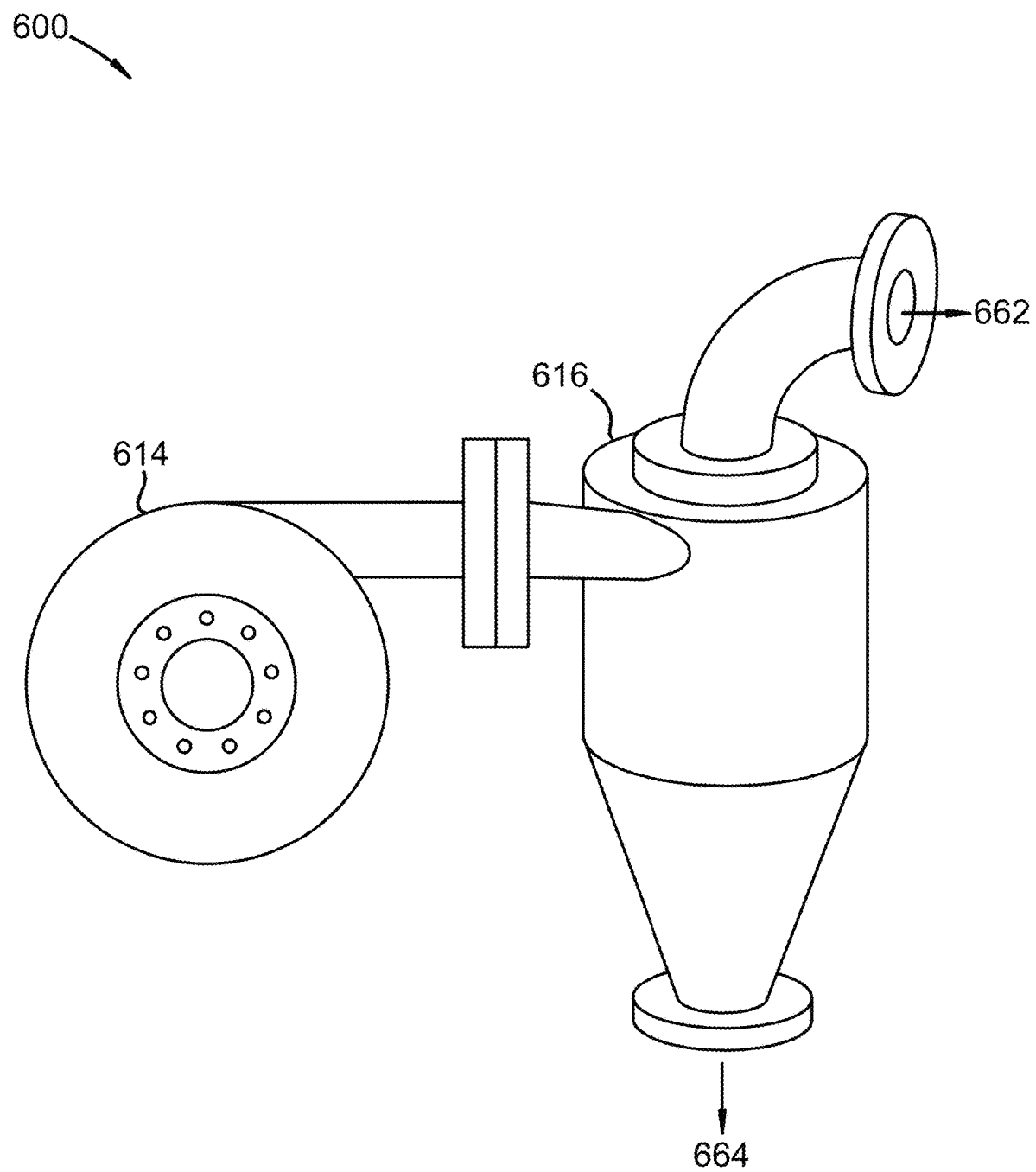
FIG. 6 shows a cryogenic turbine and hydrocyclone for use in the process shown in FIG. 1.

Referring to FIG. 6, cryogenic turbine 114 and first separation vessel 116 are shown at 600, as per FIG. 1. Cryogenic turbine 114 is shown as a centrifugal gas compressor. First separation vessel 116 is shown as a hydrocyclone. Foulant-depleted gas stream 630 is expanded through centrifugal gas compressor 614 and separated in hydrocyclone 616 to produce light gas stream 662 and second solid foulant stream 664.

In other embodiments, remainder 242 is provided to second separation vessel 220, producing overhead vapor foulant product stream 276 and bottoms liquid foulant product stream 272. Bottoms liquid foulant product stream 272 is pressurized across pump 222. Overhead vapor foulant product stream 276 is compressed across compressor 224, cooled across first heat exchanger 202, and recombined with bottoms liquid foulant product stream 272 and pressurized across pump 222 before warming across first heat exchanger 202 to produce carbon dioxide product 280.

In some embodiments, the cooled cryogenic liquid recycle stream recombines in a location comprising the second heat exchanger, the third heat exchanger, or the foulant slurry stream. In some embodiments, the gas stream comprises combustion flue gas, syngas, producer gas, natural gas, steam reforming gas, any hydrocarbon that has a lower freezing point than the temperature of the coolant, light gases, refinery off-gases, or combinations thereof.

In some embodiments, a portion of refrigeration is provided to the first heat exchanger using a reverse Rankine refrigeration cycle having a refrigerant, wherein the reverse Rankine refrigeration cycle comprises the steps of a) compressing the refrigerant, b) condensing the refrigerant, c) expanding the refrigerant, and, d) vaporizing the refrigerant. Step (b) occurs in the first heat exchanger. Step (d) occurs in the first heat exchanger. In some embodiments, step (b) includes a supplemental ambient heat exchange process. In some embodiments, step (b) also includes at least two ambient heat exchangers in parallel before the first heat exchanger. The at least two ambient heat exchangers may operate at different pressures, the different pressures matching different portions of a heat exchange process curve for the refrigerant. In some embodiments, the refrigerant comprises ethane, methane, propane, R14, nitrogen, oxygen, argon, helium, xenon, other light gases, aliphatic hydrocarbons, aromatic hydrocarbons, other refrigerants, or combinations thereof.

In some embodiments, the cryogenic liquid comprises any compound or mixture of compounds with a freezing point above a temperature at which a solid forms from the foulant. The cryogenic liquid may comprise 1,1,3-trimethylcyclopentane, 1,4-pentadiene, 1,5-hexadiene, 1-butene, 1-methyl-1-ethylcyclopentane, 1-pentene, 3,3,3,3-tetrafluoropropene, 3,3-dimethyl-1-butene, 3-chloro-1,1,1,2-tetrafluoroethane, 3-methylpentane, 3-methyl-1,4-pentadiene, 3-methyl-1-butene, 3-methyl-1-pentene, 3-methylpentane, 4-methyl-1-hexene, 4-methyl-1-pentene, 4-methylcyclopentene, 4-methyl-trans-2-pentene, bromochlorodifluoromethane, bromodifluoromethane, bromotrifluoroethylene, chlorotrifluoroethylene, cis 3-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, or combinations thereof. The foulant may comprise carbon dioxide, nitrogen oxide, sulfur dioxide, nitrogen dioxide, sulfur trioxide, hydrogen sulfide, hydrogen cyanide, water, hydrocarbons with a freezing point above a temperature of the cryogenic liquid stream, or combinations thereof.

In some embodiments, the second heat exchanger comprises a spray tower, hail tower, bubbler, fluidized bed, or combinations thereof.

In some embodiments, the foulant slurry stream is pressurized by a pump preceding the third heat exchanger. The second solid foulant stream may be pressurized by a pump.

In some embodiments, the pressurized foulant slurry stream is separated into the pressurized foulant solid stream and the cryogenic liquid stream by a device comprising a screw press, rollers, a mangle, a filter press, or combinations thereof.

In some embodiments, the third heat exchanger comprises a non-fouling heat exchanger.

In some embodiments, the second liquid foulant stream is provided to the side inlet of the distillation column. In some embodiments, the second liquid foulant stream is used for a heat recovery step.

Combustion flue gas consists of the exhaust gas from a fireplace, oven, furnace, boiler, steam generator, or other combustor. The combustion fuel sources include coal, hydrocarbons, and biomass. Combustion flue gas varies greatly in composition depending on the method of combustion and the source of fuel. Combustion in pure oxygen produces little to no nitrogen in the flue gas. Combustion using air leads to the majority of the flue gas consisting of nitrogen. The non-nitrogen flue gas consists of mostly carbon dioxide, water, and sometimes unconsumed oxygen. Small amounts of carbon monoxide, nitrogen oxides, sulfur dioxide, hydrogen sulfide, and trace amounts of hundreds of other chemicals are present, depending on the source. Entrained dust and soot will also be present in all combustion flue gas streams. The method disclosed applies to any combustion flue gases. Dried combustion flue gas has had the water removed.

Syngas consists of hydrogen, carbon monoxide, and carbon dioxide.

Producer gas consists of a fuel gas manufactured from materials such as coal, wood, or syngas. It consists mostly of carbon monoxide, with tars and carbon dioxide present as well.

Steam reforming is the process of producing hydrogen, carbon monoxide, and other compounds from hydrocarbon fuels, including natural gas. The steam reforming gas referred to herein consists primarily of carbon monoxide and hydrogen, with varying amounts of carbon dioxide and water.

Light gases include gases with higher volatility than water, including hydrogen, helium, carbon dioxide, nitrogen, and oxygen. This list is for example only and should not be implied to constitute a limitation as to the viability of other gases in the process. A person of skill in the art would be able to evaluate any gas as to whether it has higher volatility than water.

Refinery off-gases comprise gases produced by refining precious metals, such as gold and silver. These off-gases tend to contain significant amounts of mercury and other metals.

The invention claimed is:

1. A process for removing a foulant from a gas stream, the process comprising:
    cooling the gas stream having the foulant in a first heat exchanger to a first temperature that is above a frosting point of the foulant to form a cooled gas stream;
    cooling the cooled gas stream in a second heat exchanger against a cryogenic liquid stream to a second temperature that is below the frosting point of the foulant, wherein a portion of the foulant within the cooled gas stream desublimates, thereby forming a foulant-depleted gas stream and a first solid foulant stream, the first solid foulant stream becoming entrained in the cryogenic liquid stream, forming a foulant slurry stream;
    withdrawing the foulant slurry stream from the second heat exchanger;
    withdrawing the foulant-depleted gas stream from the second heat exchanger through a cryogenic turbine and a first separation vessel, wherein the foulant-depleted gas stream is expanded and separated into a light gas stream and a second solid foulant stream;
    warming the light gas stream across the third heat exchanger and the first heat exchanger, producing a warmed light gas stream;
    pressurizing the foulant slurry stream and cooling the foulant slurry stream across the third heat exchanger to produce a pressurized foulant slurry stream that is at or exceeds the triple point of the foulant;
    separating the pressurized foulant slurry stream into a first pressurized foulant solid stream and the cryogenic liquid stream;
    pressurizing the second solid foulant stream to produce a second pressurized solid foulant stream that is at or exceeds the triple point of the foulant;

melting the first pressurized foulant solid stream in a first melting heat exchanger to produce a first portion of a first liquid foulant stream;

melting the second pressurized foulant solid stream in:
the first melting heat exchanger to produce a second portion of the first liquid foulant stream; or,
a second melting heat exchanger to produce a second portion of the first liquid foulant stream, a second liquid foulant stream, or a combination thereof;

heating the first liquid foulant stream in the first heat exchanger to form a warmed foulant fluid stream;

providing the warmed foulant fluid stream to a side inlet of a distillation column, wherein the distillation column separates the warmed foulant fluid stream into an overhead foulant stream and a bottoms stream;

cooling the overhead foulant stream across the melting heat exchanger, forming a cooled overhead foulant stream, wherein a portion of the cooled overhead foulant stream is recycled to a top inlet of the distillation column;

warming a first portion of the bottoms stream in a recycle warming heat exchanger to produce a warmed bottoms stream and recycling the warmed bottoms stream to a lower inlet of the distillation column; and, cooling a second portion of the bottoms stream across the first heat exchanger to produce a cooled cryogenic liquid recycle stream;

whereby the foulant is removed from the gas stream.

2. The method of claim 1, wherein the gas stream comprises combustion flue gas, syngas, producer gas, natural gas, steam reforming gas, any hydrocarbon that has a lower freezing point than the temperature of the coolant, light gases, refinery off-gases, or combinations thereof.

3. The method of claim 1, wherein the cooled cryogenic liquid recycle stream recombines in a location comprising the second heat exchanger, the third heat exchanger, or the foulant slurry stream.

4. The method of claim 1, wherein a portion of refrigeration is provided to the first heat exchanger using a reverse Rankine refrigeration cycle having a refrigerant, wherein the reverse Rankine refrigeration cycle comprises the steps of:
a. compressing the refrigerant;
b. condensing the refrigerant;
c. expanding the refrigerant;
d. vaporizing the refrigerant;
wherein step (b) occurs in the first heat exchanger;
wherein step (d) occurs in the first heat exchanger.

5. The method of claim 4, wherein step (b) also includes a supplemental ambient heat exchange process.

6. The method of claim 4, wherein step (b) also includes at least two ambient heat exchangers in parallel before the first heat exchanger.

7. The method of claim 6, wherein the at least two ambient heat exchangers operate at different pressures, the different pressures matching different portions of a heat exchange process curve for the refrigerant.

8. The method of claim 4, wherein the refrigerant comprises ethane, methane, propane, R14, nitrogen, oxygen, argon, helium, xenon, other light gases, aliphatic hydrocarbons, aromatic hydrocarbons, other refrigerants, or combinations thereof.

9. The method of claim 1, wherein the foulant product is provided to a second separation vessel and separated into an overhead vapor foulant product stream and a bottoms liquid foulant product stream; the bottoms liquid foulant product stream is removed and pressurized; the overhead vapor foulant product stream is removed, compressed, and then cooled across the first heat exchanger and recombined with the bottoms liquid foulant product stream and pressurized and warmed across the first heat exchanger.

10. The method of claim 1, wherein the foulant product is provided to a second separation vessel and separated into an overhead vapor foulant product stream and a bottoms liquid foulant product stream; the bottoms liquid foulant product stream is removed and pressurized; the overhead vapor foulant product stream is warmed across the first heat exchanger, compressed, cooled across the first heat exchanger, and then combined with the bottoms liquid foulant product stream before being pressurized and warmed across the first heat exchanger.

11. The method of claim 1, wherein the cryogenic liquid comprises any compound or mixture of compounds with a freezing point above a temperature at which a solid forms from the foulant.

12. The method of claim 1, wherein the cryogenic liquid comprises 1,1,3-trimethylcyclopentane, 1,4-pentadiene, 1,5-hexadiene, 1-butene, 1-methyl-1-ethylcyclopentane, 1-pentene, 3,3,3,3-tetrafluoropropene, 3,3-dimethyl-1-butene, 3-chloro-1,1,1,2-tetrafluoroethane, 3-methylpentane, 3-methyl-1,4-pentadiene, 3-methyl-1-butene, 3-methyl-1-pentene, 3-methylpentane, 4-methyl-1-hexene, 4-methyl-1-pentene, 4-methylcyclopentene, 4-methyl-trans-2-pentene, bromochlorodifluoromethane, bromodifluoromethane, bromotrifluoroethylene, chlorotrifluoroethylene, cis 3-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, or combinations thereof.

13. The method of claim 1, wherein the foulant comprises carbon dioxide, nitrogen oxide, sulfur dioxide, nitrogen dioxide, sulfur trioxide, hydrogen sulfide, hydrogen cyanide, water, hydrocarbons with a freezing point above a temperature of the cryogenic liquid stream, or combinations thereof.

14. The method of claim 1, wherein the second heat exchanger comprises a spray tower, hail tower, bubbler, fluidized bed, or combinations thereof.

15. The method of claim 1, wherein the foulant slurry stream is pressurized by a pump preceding the third heat exchanger.

16. The method of claim 1, wherein the second solid foulant stream is pressurized by a pump.

17. The method of claim 1, wherein the pressurized foulant slurry stream is separated into the pressurized foulant solid stream and the cryogenic liquid stream by a device comprising a screw press, rollers, a mangle, a filter press, or combinations thereof.

18. The method of claim 1, wherein the third heat exchanger is a non-fouling heat exchanger.

19. The method of claim 1, wherein the second liquid foulant stream is provided to the side inlet of the distillation column.

20. The method of claim 1, wherein the second liquid foulant stream is used for a heat recovery step.

* * * * *